United States Patent
Ma

(10) Patent No.: US 9,755,904 B2
(45) Date of Patent: Sep. 5, 2017

(54) RECONFIGURATION RECORD MEASUREMENT TEST METHOD AND NETWORK SIDE

(71) Applicant: ZTE CORPORATION, Shenzhen, Guangdong Province (CN)

(72) Inventor: Wei Ma, Shenzhen (CN)

(73) Assignee: ZTE CORPORATION (CN)

( * ) Notice: Subject to any disclaimer, the term of this patent is extended or adjusted under 35 U.S.C. 154(b) by 63 days.

(21) Appl. No.: 14/402,703

(22) PCT Filed: Apr. 24, 2013

(86) PCT No.: PCT/CN2013/074641
§ 371 (c)(1),
(2) Date: Nov. 21, 2014

(87) PCT Pub. No.: WO2013/174191
PCT Pub. Date: Nov. 28, 2013

(65) Prior Publication Data
US 2015/0139026 A1 May 21, 2015

(30) Foreign Application Priority Data
May 22, 2012 (CN) .......................... 2012 1 0160588

(51) Int. Cl.
H04L 12/24 (2006.01)
H04W 24/10 (2009.01)
H04W 24/02 (2009.01)

(52) U.S. Cl.
CPC ...... *H04L 41/0853* (2013.01); *H04L 41/0859* (2013.01); *H04W 24/10* (2013.01); *H04W 24/02* (2013.01)

(58) Field of Classification Search
None
See application file for complete search history.

(56) References Cited

U.S. PATENT DOCUMENTS

2011/0250910 A1* 10/2011 Lee .................... H04W 24/10
455/466
2012/0083263 A1* 4/2012 Kim .................... H04W 72/085
455/423

(Continued)

FOREIGN PATENT DOCUMENTS

CN 101931981 A 12/2010
EP 2579641 A2 10/2013

(Continued)

OTHER PUBLICATIONS

European Search Report dated Jun. 24, 2015 of European patent Application No. 13793134.1.

*Primary Examiner* — Faruk Hamza
*Assistant Examiner* — Cassandra Decker
(74) *Attorney, Agent, or Firm* — Plumsea Law Group, LLC

(57) ABSTRACT

The present document provides a logged measurement reconfiguration test method, comprising: when a terminal already has a logged measurement configuration, a network side sending a new logged measurement configuration to the terminal; the network side detecting whether there is a measurement log for the logged measurement configuration that is already had by the terminal or not, and if yes, the test fails; otherwise the network side detecting whether there is a measurement log for the logged measurement configuration that is already had by the terminal or not after the terminal enters into an idle state and stays there for a specified period of time. The present document further provides a network side.

20 Claims, 2 Drawing Sheets

(56) References Cited

U.S. PATENT DOCUMENTS

| | | | |
|---|---|---|---|
| 2012/0092998 A1 | 4/2012 | Chang et al. | |
| 2012/0108199 A1* | 5/2012 | Wang | H04W 24/10 455/405 |
| 2012/0307669 A1* | 12/2012 | Kim | H04W 24/10 370/252 |
| 2013/0072182 A1* | 3/2013 | Jung | H04W 24/10 455/422.1 |
| 2013/0114446 A1* | 5/2013 | Liu | H04W 24/10 370/252 |
| 2013/0155895 A1* | 6/2013 | Kim | H04W 16/18 370/252 |
| 2013/0308489 A1* | 11/2013 | Tomala | H04W 24/08 370/252 |

FOREIGN PATENT DOCUMENTS

| | | | | |
|---|---|---|---|---|
| GB | 2479468 A | 10/2011 | | |
| KR | WO 2012023730 A2 * | 2/2012 | | H04W 16/18 |
| WO | 2011/141406 A1 | 11/2011 | | |
| WO | 2011149262 A2 | 12/2011 | | |
| WO | 2012/020814 A1 | 2/2012 | | |

\* cited by examiner

RECONFIGURATION RECORD MEASUREMENT TEST METHOD AND NETWORK SIDE

CROSS-REFERENCE TO RELATED APPLICATION(S)

This application is the U.S. National Phase application of PCT application number PCT/CN2013/074641 having a PCT filing date of Apr. 24, 2013, which claims priority of Chinese patent application 201210160588.8 filed on May 22, 2012, the disclosures of which are hereby incorporated by reference.

TECHNICAL FIELD

The present document relates to the LTE (Long Time Evolution) technology in the mobile communication technologies, and more particularly, to a logged measurement reconfiguration test method and a network side in the technology of minimization of drive test in the mobile LTE communication network.

BACKGROUND

The traditional drive test technology uses manpower to test areas which need to be monitored and optimized, and this test consumes a lot of manpower and material resources. In addition, the traditional drive test technology also has the problem that the planned test path cannot cover the actual condition of the people using the network. Based on the evolution of the next-generation networks, it is necessary to reduce dependence on the traditional drive test technology and use more intelligent network optimization tools. Therefore, it is very necessary to automatically measure the collection terminals and minimize the demands on manual drive test. On the other hand, the UE test result can be used for automatic optimization and can be used for having a comprehensive understanding on the network operation. Based on this, the Third Generation Partnership Organization proposed the technology of minimization of drive test based on the automatic measuring and reporting of the terminal. The technology of minimization of drive test performs the test based on the user terminal, and no additional manpower and material resources are needed for the test. At the same time, since it is an actual user, the actual use of the terminal can be fully taken into account, so as to solve the problem that a perfect planning cannot be performed in the drive test planning.

The minimization of drive test technology comprises immediate measurement and logged measurement. The immediate measurement technology refers to that the terminal performs the related network measurement immediately after the terminal receives a measurement requirement. The logged measurement technology refers to that the terminal performs a measurement and stores the measurement log in the terminal when the terminal is in the idle state according to the received relevant logged measurement configuration information of the network side, and the network side obtains the measurement log saved by the terminal in the connected state.

In the current technology of minimization of drive test, there are relevant technical schemes for the logged measurement technology. In the case that the relevant logged measurement has already been configured, the terminal needs to release the original logged measurement configuration and measurement log after receiving a new logged measurement configuration. However, there is still no test method in the case that the terminal receives a new logged measurement configuration when a logged measurement of the minimization of drive test has already been configured.

SUMMARY

To solve the technical problem, the present document provides a logged measurement reconfiguration test method and a network side, to implement the logged measurement reconfiguration in the technology of minimization of drive test.

To solve the abovementioned problem, the present document provides a logged measurement reconfiguration test method, comprising:

a network side sending a new logged measurement configuration to a terminal when the terminal already has a logged measurement configuration;

the network side detecting whether there is a measurement log for the logged measurement configuration that is already had by the terminal or not, and if yes, a test fails, otherwise the network side detecting whether there is a measurement log for the logged measurement configuration that is already had by the terminal or not after the terminal enters into an idle state and stays there for a specified period of time.

The abovementioned method may have the following feature, the step of the network side detecting whether there is a measurement log for the logged measurement configuration that is already had by the terminal or not comprises:

the network side sending a terminal information request message carrying a logged measurement report request flag to the terminal, and judging whether a terminal information response message returned by the terminal carries a logged measurement report for the logged measurement configuration that is already had by the terminal or not.

The abovementioned method may further have the following feature, the network side judges whether the logged measurement report carried in the terminal information response message is for the logged measurement configuration that is already had by the terminal or not in the following manner:

the network side detects whether an absolute time stamp in the logged measurement report is consistent with an absolute time stamp in the logged measurement configuration that is already had or not.

The abovementioned method may further have the following feature: the specified period of time is any value that is larger than measurement time intervals of the logged measurement configuration that is already had and the new logged measurement configuration of the terminal.

The abovementioned method may further have the following feature: the network side sends the new logged measurement configuration to the terminal after the terminal obtains the logged measurement configuration that is already had, enters into the idle state, and stays there for a preset period of time.

The abovementioned method may further have the following feature: the preset period of time is any value that is larger than a measurement time interval of the logged measurement configuration that is already had by the terminal.

The abovementioned method may further have the following feature: the network side is a system simulator, or a network side in an actual communication system.

The present document further provides a network side, comprising:

a configuration unit, which is configured to send a new logged measurement configuration to a terminal when the terminal already has a logged measurement configuration;

a test unit, which is configured to detect whether there is a measurement log for the logged measurement configuration that is already had by the terminal or not, and if yes, a test fails, otherwise, detect whether there is a measurement log for the logged measurement configuration that is already had by the terminal or not after the terminal enters into the idle state and stays there for a specified period of time.

The abovementioned network side may further have the following feature: the test unit detects whether there is a measurement log for the logged measurement configuration that is already had by the terminal or not in the following manner:

the test unit sends a terminal information request message carrying a logged measurement report request flag to the terminal, and judges whether a terminal information response message returned by the terminal carries a logged measurement report for the logged measurement configuration that is already had by the terminal or not.

The abovementioned network side may further have the following feature, the test unit judges whether the logged measurement report carried in the terminal information response message is for the logged measurement configuration that is already had by the terminal or not in the following manner:

detect whether an absolute time stamp in the logged measurement report is consistent with an absolute time stamp in the logged measurement configuration that is already had or not.

The abovementioned network side may further have the following feature: the specified period of time is any value that is larger than measurement time intervals of the logged measurement configuration that is already had and the new logged measurement configuration of the terminal.

The abovementioned network side may further have the following feature: the configuration unit sends the new logged measurement configuration to the terminal after the terminal obtains the logged measurement configuration that is already had, enters into the idle state, and stays there for a preset period of time.

The abovementioned network side may further have the following feature: the preset period of time is any value that is larger than a measurement time interval of the logged measurement configuration that is already had by the terminal.

The abovementioned network side may further have the following feature: the network side is a system simulator, or a network side in an actual communication system.

The present document achieves the update of the logged measurement configuration.

PREFERRED EMBODIMENTS OF THE DOCUMENT

Figure 1:
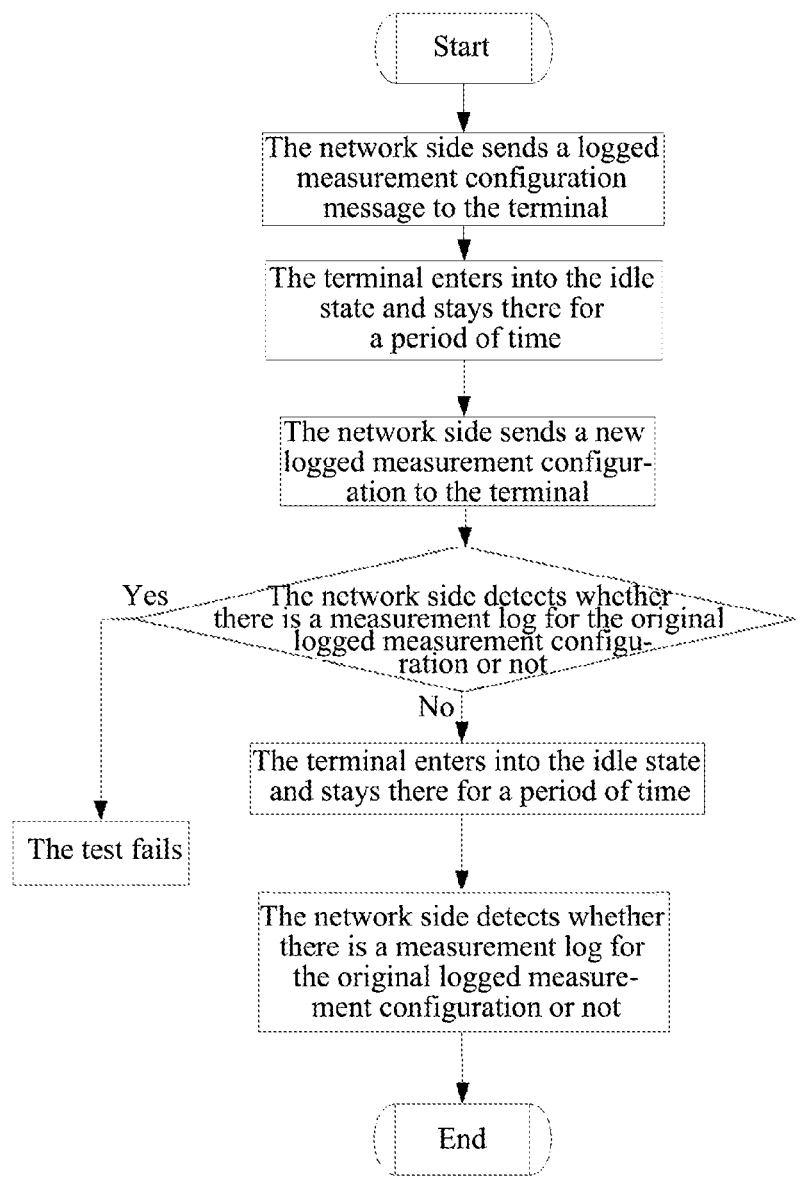
FIG. 1 is a flow chart of a logged measurement reconfiguration test method in accordance with an embodiment of the present document.

To make the objectives, technical solutions and advantages of the present document more apparent, hereinafter in conjunction with the accompanying drawings, the embodiments of the present document will be described in detail. It should be noted that, in the case of no conflict, the embodiments and features in the embodiments of the present application may be arbitrarily combined with each other.

The embodiment of the present document provides a logged measurement reconfiguration test method, comprising:

the network side sends a new logged measurement configuration to the terminal when the terminal already has a logged measurement configuration;

the network side detects whether there is a measurement log for the logged measurement configuration that is already had by the terminal or not, and if yes, the test fails, otherwise the network side detects whether there is a measurement log for the logged measurement configuration that is already had by the terminal or not after the terminal enters into the idle state and stays there for a specified period of time.

Wherein, the step of the network side detecting whether there is a measurement log for the logged measurement configuration that is already had by the terminal or not comprises:

the network side sending a terminal information request message carrying a logged measurement report request flag to the terminal, and judging whether a terminal information response message returned by the terminal carries a logged measurement report for the logged measurement configuration that is already had by the terminal or not.

Wherein, the network side judges whether the logged measurement report carried in the terminal information response message is for the logged measurement configuration that is already had by the terminal or not in the following manner:

the network side detects whether the absolute time stamp in the logged measurement report is consistent with the absolute time stamp in the logged measurement configuration that is already had or not.

Wherein, the specified period of time is any value that is larger than measurement time intervals of the logged measurement configuration that is already had and the new logged measurement configuration of the terminal Wherein, the network side sends the new logged measurement configuration to the terminal after the terminal obtains the logged measurement configuration that is already had, enters into the idle state, and stays there for a preset period of time.

Wherein, the preset period of time is any value that is larger than a measurement time interval of the logged measurement configuration that is already had by the terminal.

Wherein, the network side is a system simulator or a network side in the actual communication system.

The present document provides a method for determining a logged measurement configuration corresponding to the logged measurement report when reconfiguring a log in the LTE network:

determine the logged measurement configuration corresponding to the measurement report by detecting the absolute time stamp of the logged measurement report sent by the terminal.

Wherein, determining the logged measurement configuration corresponding to the measurement report by detecting the absolute time stamp of the logged measurement report sent by the terminal is particularly: if the time stamp in the logged measurement report is consistent with the absolute time stamp in the logged measurement configuration, the logged measurement report is considered corresponding to the logged measurement configuration.

The embodiment of the present document provides a logged measurement reconfiguration test method in the LTE network, and as shown in FIG. 1, it comprises the following operations:

1) the network side sends a logged measurement configuration message to the terminal;

2) the terminal enters into the idle state and stays there for a period of time;

3) the network side sends a new logged measurement configuration to the terminal;

4) the network side detects whether there is a measurement log for the measurement configuration in step 1) or not, and if yes, the test fails, otherwise, proceed to step 5);

5) the terminal enters into the idle state and stays there for a period of time;

6) detect whether the terminal has a measurement log for the measurement configuration in step 1) or not.

In the abovementioned logged measurement reconfiguration test method in the LTE network, the operation of sending the logged measurement configuration message to the terminal in step 1) needs the terminal first enter into the radio resource connection state.

In the abovementioned logged measurement reconfiguration test method in the LTE network, the period of time in step 2) is any value of a period of time that is larger than the time interval in the logged measurement configuration in step 1).

In the abovementioned logged measurement reconfiguration test method in the LTE network, the operation of sending the logged measurement configuration message to the terminal in step 3) needs the terminal first enter into the radio resource connection state.

In the abovementioned logged measurement reconfiguration test method in the LTE network, detecting whether there is a measurement log for the measurement configuration in step 1) or not in step 4) comprises: the network side sending a terminal information request message to the terminal, wherein the message carries a logged measurement report request flag; detecting whether the terminal response information returned by the terminal carries a logged measurement report or not so as to detect whether there is a measurement log or not.

In the abovementioned logged measurement reconfiguration test method in the LTE network, the period of time in step 5) is any value simultaneously larger than the measurement time intervals in the logged measurement configuration messages in steps 1) and 3).

In the abovementioned logged measurement reconfiguration test method in the LTE network, detecting whether there is a network measurement log for the measurement configuration in step 1) or not in step 6) comprises: the network side sending a terminal information request message to the terminal, wherein the message carries a logged measurement report request flag; the network side detecting whether there is a measurement log corresponding to the logged measurement configuration in step 1) or not by detecting whether the terminal response message returned by the terminal carries the logged measurement report or not.

Said detecting whether there is a measurement log corresponding to the logged measurement configuration in step 1) or not by detecting whether the logged measurement report is carried or not is implemented by detecting whether the absolute time stamp in the logged measurement report is consistent with the absolute time stamp in the logged measurement configuration sent in step 1) or not.

The abovementioned network side can be a system simulator simulated by a test instrument, or a network side in the actual communication system.

The First Embodiment

The embodiment of the present document provides a logged measurement reconfiguration test method in the LTE network, comprising:

1) configure the terminal and the network so that the terminal enters into the radio resource connection state;

2) the network sends the logged measurement configuration information to the terminal, and configures the measurement time interval as 2.56 seconds;

wherein 2.56 seconds is only for illustration, and another value can be set as needed;

3) the network side sends a radio resource connection release message to the terminal, and the terminal enters into the idle state;

4) wait for 30 seconds, so that the terminal can perform logged measurement in this period of time;

wherein, 30 seconds is only for illustration and another value larger than 2.56 seconds can be set as needed;

5) establish a radio resource connection between the terminal and the network;

6) the network sends the logged measurement configuration information to the terminal, and configures the measurement time interval as 2.56 seconds;

7) the network side sends a terminal information request to obtain the measurement log;

8) detect whether the terminal response information returned by the terminal carries the logged measurement report or not, and if yes, the test fails, otherwise proceed to step 9);

9) the network side sends a radio resource connection release message to the terminal, and the terminal enters into the idle state;

10) wait for 30 seconds, so that the terminal can perform the logged measurement in this period of time;

11) establish a radio resource connection between the terminal and the network;

12) the network side sends a terminal information request to obtain the measurement log;

13) detect whether the terminal response information returned by the terminal carries a logged measurement report in which the absolute time stamp is consistent with the absolute time stamp in the logged measurement configuration in step 1) or not. If yes, the test fails, otherwise the test passes.

Figure 2:
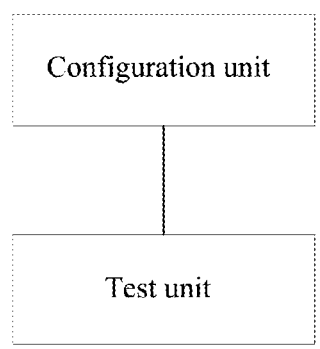
FIG. 2 is a block diagram of a network side in accordance with an embodiment of the present document.

The embodiment of the present document further provides a network side, as shown in FIG. 2, comprising:

a configuration unit, which is configured to, send a new logged measurement configuration to the terminal when the terminal already has a logged measurement configuration;

a test unit, which is configured to, detect whether there is a measurement log for the logged measurement configuration that is already had by the terminal or not, and if yes, the test fails, otherwise, detect whether there is a measurement log for the logged measurement configuration that is already had by the terminal or not after the terminal enters into the idle state and stays there for a specified period of time.

Wherein, the test unit detects whether there is a measurement log for the logged measurement configuration that is already had by the terminal or not in the following manner:

the test unit sends a terminal information request message carrying a logged measurement report request flag to the terminal, and judges whether the terminal information response message returned by the terminal carries a logged measurement report for the logged measurement configuration that is already had by the terminal or not.

Wherein, the test unit judges whether the logged measurement report carried in the terminal information response message is for the logged measurement configuration that is already had by the terminal or not in the following manner:

detect whether the absolute time stamp in the logged measurement report is consistent with the absolute time stamp in the logged measurement configuration that is already had or not.

Wherein, the specified period of time is any value that is larger than measurement time intervals of the logged measurement configuration that is already had and the new logged measurement configuration of the terminal.

Wherein, the configuration unit sends the new logged measurement configuration to the terminal after the terminal obtains the logged measurement configuration that is already had, enters into the idle state, and stays there for a preset period of time.

Wherein, the preset period of time is any value that is larger than a measurement time interval of the logged measurement configuration that is already had by the terminal.

Wherein, the network side is a system simulator, or the network side in the actual communication system.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

INDUSTRIAL APPLICABILITY

The present document achieves the update of the logged measurement configuration.

What is claimed is:

1. A method of performing a logged measurement reconfiguration test, comprising:
    a network side sending a new logged measurement configuration to a terminal when the terminal already has a logged measurement configuration;
    the network side detecting whether or not there is a measurement log for the logged measurement configuration that is already had by the terminal, in order to detect whether the terminal has released the measurement log for the logged measurement configuration that is already had by the terminal after receiving the new logged measurement configuration and
        if there is a measurement log for the logged measurement configuration that is already had by the terminal, the terminal has not released the measurement log, and the logged measurement reconfiguration test fails,
        if there is no measurement log, the terminal has released the measurement log, and after the terminal enters into an idle state and stays there for a specified period of time, the network side detects whether or not there is a measurement log corresponding to the logged measurement configuration that is already had by the terminal in order to detect whether the terminal has released the logged measurement configuration that is already had by the terminal after receiving the new logged measurement configuration,
        if there is a measurement log for the logged measurement configuration that is already had by the terminal, the terminal has not released the logged measurement configuration, and the logged measurement reconfiguration test fails,
        if there is no measurement log, the logged measurement reconfiguration test is passed.

2. The method of claim 1, wherein, the step of the network side detecting whether or not there is a measurement log for the logged measurement configuration that is already had by the terminal comprises:
    the network side sending a terminal information request message carrying a logged measurement report request flag to the terminal, and judging whether or not a terminal information response message returned by the terminal carries a logged measurement report for the logged measurement configuration that is already had by the terminal.

3. The method of claim 2, wherein, the network side judges whether or not the logged measurement report carried in the terminal information response message is for the logged measurement configuration that is already had by the terminal in the following manner:
    the network side detects whether or not an absolute time stamp in the logged measurement report is consistent with an absolute time stamp in the logged measurement configuration that is already had.

4. The method of claim 3, wherein, the network side is a system simulator or a network side in an actual communication system.

5. The method of claim 2, wherein, the network side is a system simulator or a network side in an actual communication system.

6. The method of claim 1, wherein, the specified period of time is any value that is larger than each measurement time interval of the logged measurement configuration that is already had by the terminal and larger than each measurement time interval of the new logged measurement configuration of the terminal.

7. The method of claim 6, wherein, the network side is a system simulator or a network side in an actual communication system.

8. The method of claim 1, wherein, the network side sends the new logged measurement configuration to the terminal after the terminal obtains the logged measurement configuration that is already had, enters into the idle state, and stays there for a preset period of time.

9. The method of claim 8, wherein, the preset period of time is any value that is larger than a measurement time interval of the logged measurement configuration that is already had by the terminal.

10. The method of claim 9, wherein, the network side is a system simulator or a network side in an actual communication system.

11. The method of claim 8, wherein, the network side is a system simulator or a network side in an actual communication system.

12. The method of claim 1, wherein, the network side is a system simulator or a network side in an actual communication system.

13. A network side, comprising a processor and a storage device, wherein the storage device stores processor-executable programs, and the programs comprise:
- a configuration unit, which is configured to send a new logged measurement configuration to a terminal when the terminal already has a logged measurement configuration;
- a test unit, which is configured to execute a logged measurement reconfiguration test in which the test unit detects whether or not there is a measurement log for the logged measurement configuration that is already had by the terminal, in order to detect whether the terminal has released the measurement log for the logged measurement configuration that is already had by the terminal after receiving the new logged measurement configuration and
- if there is a measurement log for the logged measurement configuration that is already had by the terminal, the terminal has not released the measurement log and the logged measurement reconfiguration test fails,
- if there is no measurement log, the terminal has released the measurement log and the test unit proceeds to, after the terminal enters into an idle state and stays there for a specified period of time, detect whether or not there is a measurement log corresponding to the logged measurement configuration that is already had by the terminal, in order to detect whether the terminal has released the logged measurement configuration that is already had by the terminal after receiving the new logged measurement configuration,
- if there is a measurement log for the logged measurement configuration that is already had by the terminal, the terminal has not released the logged measurement configuration, and the logged measurement reconfiguration test fails,
- if there is no measurement log, the logged measurement reconfiguration test is passed.

14. The network side of claim 13, wherein, the test unit detects whether or not there is a measurement log for the logged measurement configuration that is already had by the terminal in the following manner:
- the test unit sends a terminal information request message carrying a logged measurement report request flag to the terminal, and judges whether or not a terminal information response message returned by the terminal carries a logged measurement report for the logged measurement configuration that is already had by the terminal.

15. The network side of claim 14, wherein, the test unit judges whether or not the logged measurement report carried in the terminal information response message is for the logged measurement configuration that is already had by the terminal in the following manner:
- detect whether or not an absolute time stamp in the logged measurement report is consistent with an absolute time stamp in the logged measurement configuration that is already had.

16. The network side of claim 14, wherein, the network side is a system simulator, or a network side in an actual communication system.

17. The network side of claim 13, wherein, the specified period of time is any value that is larger than each measurement time interval of the logged measurement configuration that is already had and larger than each measurement time interval of the new logged measurement configuration of the terminal.

18. The network side of claim 13, wherein, the configuration unit sends the new logged measurement configuration to the terminal after the terminal obtains the logged measurement configuration that is already had, enters into the idle state, and stays there for a preset period of time.

19. The network side of claim 18, wherein, the preset period of time is any value that is larger than a measurement time interval of the logged measurement configuration that is already had by the terminal.

20. The network side of claim 13, wherein, the network side is a system simulator, or a network side in an actual communication system.

* * * * *